United States Patent
Kodera

(10) Patent No.: US 11,345,363 B2
(45) Date of Patent: May 31, 2022

(54) STEERING SYSTEM

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 396 days.

(21) Appl. No.: 16/254,054

(22) Filed: Jan. 22, 2019

(65) Prior Publication Data
US 2019/0232975 A1 Aug. 1, 2019

(30) Foreign Application Priority Data

Jan. 29, 2018 (JP) .............................. JP2018-012598

(51) Int. Cl.
*B60W 50/12* (2012.01)
*B62D 6/00* (2006.01)
(Continued)

(52) U.S. Cl.
CPC ............ *B60W 50/12* (2013.01); *B60W 10/20* (2013.01); *B60W 50/082* (2013.01);
(Continued)

(58) Field of Classification Search
CPC ...... B60W 50/12; B60W 50/10; B60W 10/20; B62D 1/286; B62D 6/008
See application file for complete search history.

(56) References Cited

U.S. PATENT DOCUMENTS

2004/0238257 A1 12/2004 Takahashi et al.
2016/0207527 A1 7/2016 Hiei et al.
(Continued)

FOREIGN PATENT DOCUMENTS

DE 102016111473 A1 12/2016
EP 1227027 A2 7/2002
(Continued)

OTHER PUBLICATIONS

Jun. 24, 2019 extended Search Report issued in European Patent Application No. 19153448.6.
(Continued)

*Primary Examiner* — Alan D Hutchinson
*Assistant Examiner* — Andy Schneider
(74) *Attorney, Agent, or Firm* — Oliff PLC

(57) ABSTRACT

A steering system includes a reaction drive apparatus to apply a reaction force to a steering member, a steering operation drive apparatus to turn steered wheels, a movement drive apparatus to move the steering member between an operation position and a retraction position, a mode switching circuit to switch a manual driving mode and an automatic driving mode, a movement control circuit to move the steering member to the operation position when switched to the manual driving mode, and to move the steering member to the retraction position when switched to the automatic driving mode, a reaction control circuit to control the reaction drive apparatus in the manual driving mode based on steering information of the steering member and steering operation information of the steering operation drive apparatus, and an actuation restriction circuit to restrict actuation of the steering member in the automatic driving mode.

2 Claims, 9 Drawing Sheets

(51) Int. Cl.
    *B62D 5/00*         (2006.01)
    *B62D 1/18*         (2006.01)
    *B60W 10/20*       (2006.01)
    *B60W 50/08*       (2020.01)
    *B60W 50/10*       (2012.01)
    *B62D 1/28*         (2006.01)
    *B62D 1/181*       (2006.01)

(52) U.S. Cl.
    CPC .............. *B60W 50/10* (2013.01); *B62D 1/18* (2013.01); *B62D 1/181* (2013.01); *B62D 1/286* (2013.01); *B62D 5/006* (2013.01); *B62D 6/008* (2013.01)

(56) References Cited

U.S. PATENT DOCUMENTS

2016/0347348 A1  12/2016  Lubischer et al.
2016/0368522 A1  12/2016  Lubischer et al.
2017/0029013 A1*  2/2017  Oya ..................... B62D 15/027
2017/0029018 A1   2/2017  Lubischer et al.
2018/0154932 A1*  6/2018  Rakouth ................ B62D 1/286
2019/0241213 A1*  8/2019  Szepessy ............... B62D 6/008

FOREIGN PATENT DOCUMENTS

| | | |
|---|---|---|
| GB | 2550640 A | 11/2017 |
| JP | 2002-193111 A | 7/2002 |
| JP | 2004-224238 A | 8/2004 |
| JP | 2004-314891 A | 11/2004 |
| JP | 2006-224804 A | 8/2006 |
| JP | 2006-264374 A | 10/2006 |
| JP | 2015-048034 A | 3/2015 |
| WO | 2015/033484 A1 | 3/2015 |

OTHER PUBLICATIONS

Mar. 22, 2022 Notice of Reasons for Refusal issued in Japanese Patent Application No. 2018-012598.

\* cited by examiner

FIG. 9

| | SPECIFIC EXAMPLES OF RESTRICTION OF ACTUATION OF STEERING MEMBER |
|---|---|
| PATTERN 1 | • STOP REACTION CONTROL<br>• MECHANICALLY RESTRICT ACTUATION |
| PATTERN 2 | • SET REACTION TORQUE TO BE EQUAL TO OR SMALLER THAN PREDETERMINED VALUE<br>• MECHANICALLY RESTRICT ACTUATION |
| PATTERN 3 | • FIX REACTION-SIDE TARGET STEERING ANGLE TO zero |
| PATTERN 4 | • FIX REACTION-SIDE TARGET STEERING ANGLE AS IT IS |
| PATTERN 5 | • PERFORM LOCK ENERGIZATION FOR REACTION MOTOR |
| PATTERN 6 | • PERFORM PHASE-FIXED ENERGIZATION FOR REACTION MOTOR |
| PATTERN 7 | • SET GAIN FOR USE IN FEEDBACK CONTROL TO BE EQUAL TO OR SMALLER THAN PREDETERMINED VALUE<br>• MECHANICALLY RESTRICT ACTUATION |
| PATTERN 8 | • SET DEVIATION FOR USE IN FEEDBACK CONTROL TO BE EQUAL TO OR SMALLER THAN PREDETERMINED VALUE<br>• MECHANICALLY RESTRICT ACTUATION |

# STEERING SYSTEM

INCORPORATION BY REFERENCE

The disclosure of Japanese Patent Application No. 2018-012598 filed on Jan. 29, 2018, including the specification, drawings and abstract, is incorporated herein by reference in its entirety.

BACKGROUND OF THE INVENTION

1. Field of the Invention

The present invention relates to a steering system.

2. Description of the Related Art

Japanese Patent Application Publication No. 2015-48034 (JP 2015-48034 A) discloses a technology relating to an automatic driving apparatus capable of switching a driving mode between an automatic driving mode in which steering and other operations for a vehicle are performed without depending on a driving operation and a manual driving mode in which the steering and other operations for the vehicle are performed in response to the driving operation. There is known a so-called steer-by-wire type steering system in which a steering member and a steering operation mechanism are not mechanically coupled to each other. For example, Japanese Patent Application Publication No. 2006-224804 (JP 2006-224804 A) discloses a steer-by-wire type steering system including a reaction drive apparatus configured to detect a steering torque applied to a steering member and a road reaction force applied to steered wheels and to apply a steering reaction force to the steering member based on the detected steering torque and the detected road reaction force. Japanese Patent Application Publication. No. 2002-193111 (JP 2002-193111 A) discloses a technology for housing a steering member at a housing position when a user uses a cabin for other purposes than driving the vehicle.

In a vehicle using the steer-by-wire type steering system, the inventors of the present invention have made an attempt to house (retract), during automatic driving, a steering member at a housing position (retraction position) that is different from the position of the steering member during manual driving. When a steering reaction force is applied from a reaction drive apparatus to the steering member retracted to the retraction position, the steering member is actuated though no steering operation is performed. An occupant who views this situation may have a feeling of strangeness.

SUMMARY OF THE INVENTION

It is one object of the present invention to provide a steering system in which actuation of a steering member that is caused by a reaction drive apparatus can be suppressed during automatic driving.

A steering system of the present invention includes a mode input apparatus, a steering member, a reaction drive apparatus, a steering operation drive apparatus, a movement drive apparatus, a mode switching circuit, a movement control circuit, a reaction control circuit, and an actuation restriction circuit. The mode input apparatus is configured to input a manual driving mode that is based on an operation to be performed by an occupant, and an automatic driving mode that is not based on the operation to be performed by the occupant. The steering member is configured to be located at an operation position in the manual driving mode, and to be located at a predetermined retraction position different from the operation position in the automatic driving mode. The reaction drive apparatus is configured to apply a reaction force to the steering member. The steering operation drive apparatus is configured to turn a steered wheel. The movement drive apparatus is configured to move the steering member between the operation position and the retraction position. The mode switching circuit is configured to switch the manual driving mode and the automatic driving mode based on an input to the mode input apparatus. The movement control circuit is configured to move the steering member to the operation position when switching to the manual driving mode is performed, and to move the steering member to the retraction position when switching to the automatic driving mode is performed. The reaction control circuit is configured to control the reaction drive apparatus in the manual driving mode based on steering information of the steering member and steering operation information of the steering operation drive apparatus. The actuation restriction circuit is configured to restrict actuation of the steering member that is caused by the reaction drive apparatus in the automatic driving mode.

According to the steering system of the present invention, the actuation restriction circuit restricts the actuation of the steering member in the automatic driving mode. Thus, the steering system can reduce the occurrence of the case where the steering member arranged at the retraction position is actuated by being driven by the reaction drive apparatus. As a result, the steering system can prevent the occupant from feeling strange due to the actuation of the steering member arranged at the retraction position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9 is a table illustrating specific examples of restriction of actuation of the steering member, which is performed by an actuation restriction circuit.

DETAILED DESCRIPTION OF EMBODIMENTS

A steering system according to the present invention is described below with reference to the drawings. First, an overview of a vehicle 1 using a steering system 100 according to one embodiment of the present invention is described with reference to FIG. 1A and FIG. 1B.

Figure 1A:
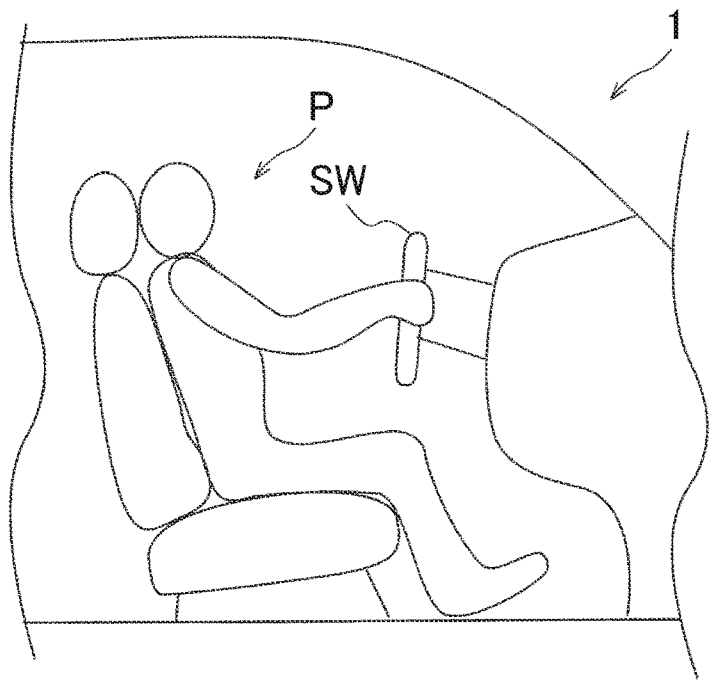
FIG. 1A is a diagram illustrating a cabin of a vehicle using a steering system according to one embodiment of the present invention, and illustrating a state in which a steering member is located at an operation position.
Figure 1B:
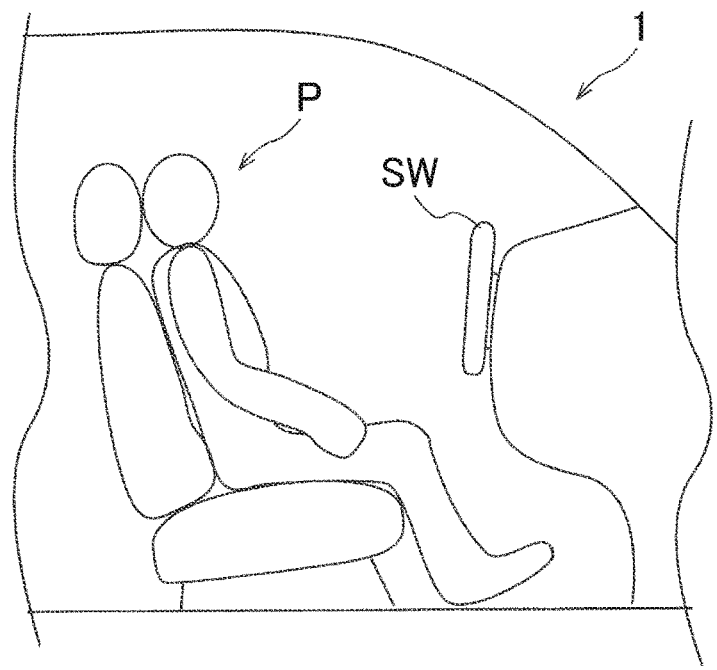
FIG. 1B is a diagram illustrating the cabin of the vehicle, and illustrating a state in which the steering member is located at a retraction position.

As illustrated in FIG. 1A and FIG. 1B, the vehicle 1 has a manual driving mode and an automatic driving mode as driving modes in which the vehicle 1 travels. The manual driving mode is based on an operation to be performed by an occupant P. The automatic driving mode is not based on the operation to be performed by the occupant P. In the manual driving mode, steered wheels 33 (see FIG. 2) are turned based on a steering operation for a steering member SW that is performed by the occupant P. In the automatic driving mode, the vehicle 1 automatically turns the steered wheels 33 based on, for example, a traveling condition of the vehicle 1, a road condition, and a route to a destination that is set in advance.

The steering member SW is provided with a mode input apparatus 2 (see FIG. 4) configured to input any one driving mode out of the manual driving mode and the automatic driving mode. The occupant P can switch the driving mode through an input to the mode input apparatus 2. In this embodiment, description is given of a case where the input is made to the mode input apparatus 2 through an operation performed by the occupant P. The input may be made to the mode input apparatus 2 by the vehicle 1 automatically when a predetermined condition is satisfied. For example, the vehicle 1 may monitor the traveling condition of the vehicle 1 and the condition of the driver, and automatically make the input to the mode input apparatus 2 to switch the driving mode when the vehicle 1 determines that a predetermined condition is satisfied or when the vehicle 1 determines that a predetermined condition is not satisfied.

As illustrated in FIG. 1A, the vehicle 1 in the manual driving mode arranges the steering member SW at an operation position where the occupant P can easily operate the steering member SW. As illustrated in FIG. 1B, the vehicle 1 in the automatic driving mode arranges the steering member SW at a retraction position where the steering member SW hardly comes into contact with the occupant P. The retraction position is a position different from the operation position. In this case, the vehicle 1 allows the occupant P to easily operate the steering member SW in the manual driving mode and to effectively use a space in a cabin of the vehicle 1 in the automatic driving mode.

Figure 2:
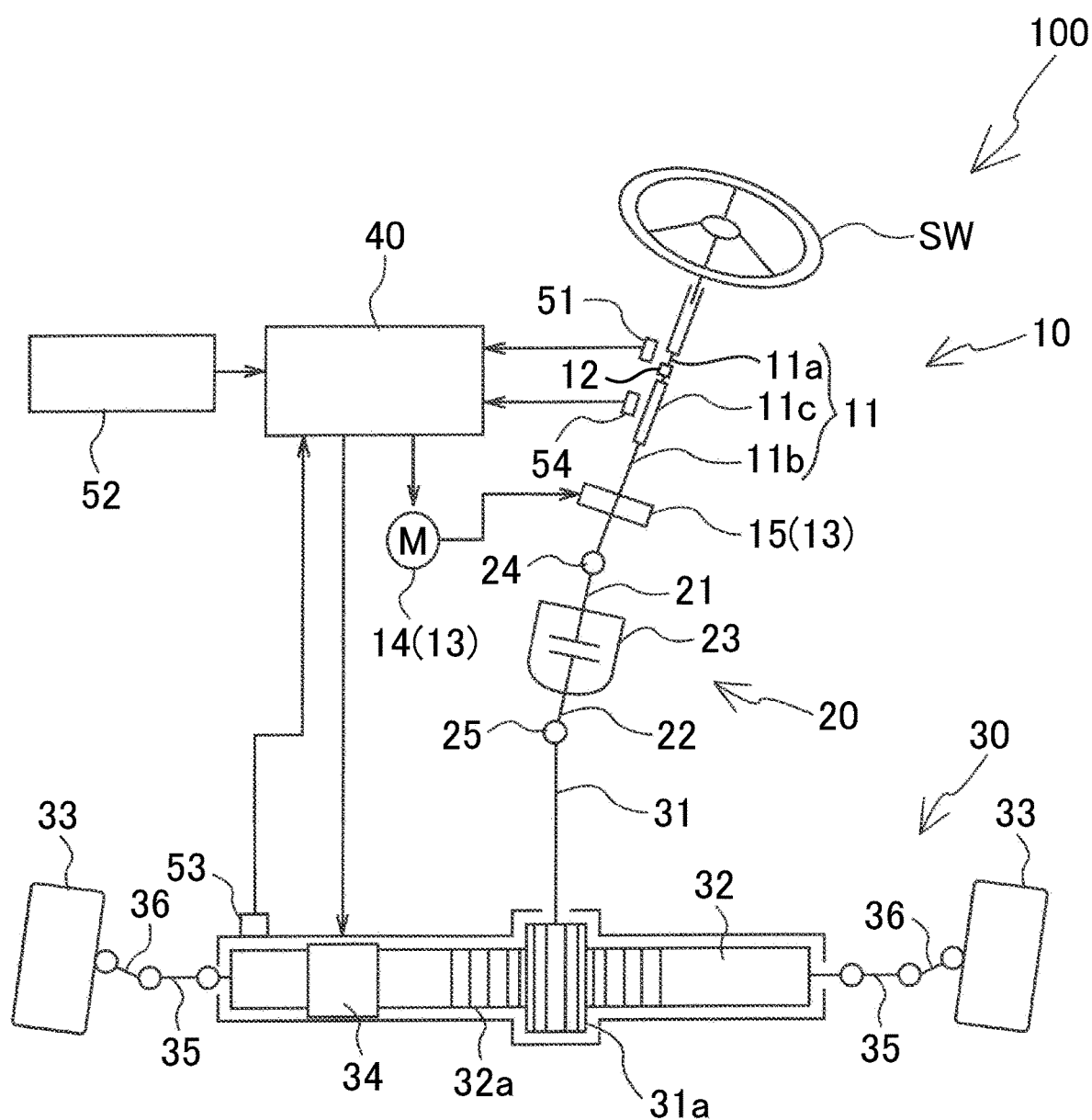
FIG. 2 is a diagram illustrating the structure of the steering system.

Next, the schematic structure of the steering system 100 is described with reference to FIG. 2. As illustrated in FIG. 2, the steering system 100 mainly includes a steering mechanism 10, an intermediate shaft 20, a steering operation mechanism 30, and a control unit 40. As the steering system 100, there is employed a so-called steer-by-wire system in which the steering mechanism 10 and the steering operation mechanism 30 are mechanically decoupled from each other at the intermediate shaft 20.

The steering mechanism 10 mainly includes the steering member SW, a steering shaft member 11, a movement drive apparatus 12 (see FIG. 4), and a reaction drive apparatus 13. The steering shaft member 11 couples the steering member SW and the intermediate shaft 20 to each other.

The steering shaft member 11 includes an input steering shaft 11a, an output steering shaft 11b, and a torsion bar 11c. The steering member SW is coupled to one end side of the input steering shaft 11a so as to be rotatable together with the input steering shaft 11a. The other axial end side of the input steering shaft 11a is coupled to the output steering shaft 11b via the torsion bar 11c. The torsion bar 11c is twisted based on a torque difference between the input steering shaft 11a and the output steering shaft 11b.

The input steering shaft 11a is formed telescopically. That is, the input steering shaft 11a is extended at the operation position, and is contracted at the retraction position. The movement drive apparatus 12 is an actuator configured to move the steering member SW through telescopic motion of the input steering shaft 11a. That is, when the steering member SW is moved to the retraction position, the vehicle 1 drives the movement drive apparatus 12 to contract the input steering shaft 11a. When the steering member SW is moved to the operation position, the vehicle 1 drives the movement drive apparatus 12 to extend the input steering shaft 11a.

In this embodiment, the vehicle 1 is provided with the steering member SW so that the steering member SW is movable between the operation position and the retraction position through the telescopic motion of the input steering shaft 11a, but the present invention is not limited to this case. For example, in the vehicle 1, the input steering shaft 11a may be formed in a bendable manner, and the steering member SW may be provided so as to be movable between the operation position and the retraction position such that the input steering shaft 11a is set into a linear shape at the operation position and is bent at the retraction position.

In the manual driving mode, the reaction drive apparatus 13 applies a reaction force (reaction torque) to the steering member SW via the steering shaft member 11. The reaction force is a force in a direction opposite to a direction of a steering operation for the steering member SW. The reaction drive apparatus 13 mainly includes a reaction motor 14 and a speed reducer 15. The reaction motor 14 is a drive source of the reaction force to be applied to the steering member SW. The speed reducer 15 reduces the speed of output rotation of the reaction motor 14, and outputs an obtained torque to the steering shaft member 11.

The intermediate shaft 20 includes a first shaft member 21, a second shaft member 22, and a driving force transmission apparatus 23. The first shaft member 21 is coupled to the steering shaft member 11 via a universal joint 24. The second shaft member 22 is coupled to the steering operation mechanism 30 via a universal joint 25. The driving force transmission apparatus 23 is interposed between the first shaft member 21 and the second shaft member 22. In the intermediate shaft 20, the first shaft member 21 and the second shaft member 22 are not mechanically coupled to each other, and the driving force transmission apparatus 23 transmits a rotational force between the first shaft member 21 and the second shaft member 22 or interrupts the transmission of the rotational force.

The driving force transmission apparatus 23 interrupts the transmission of the rotational force between the first shaft member 21 and the second shaft member 22 during normal driving in the manual driving mode and during the automatic driving mode. The driving force transmission apparatus 23 transmits the rotational force between the first shaft member 21 and the second shaft member 22 when the ignition of the vehicle is turned. OFF or when emergency occurs due to, for example, trouble in the steer-by-wire system.

The steering operation mechanism 30 mainly includes a pinion shaft 31, a steering operation shaft member 32, the steered wheels 33, and a steering operation drive apparatus 34. One axial end side of the pinion shaft 31 is coupled to the second shaft member 22 via the universal joint 25. A pinion 31a is formed on the other axial end side of the pinion shaft 31. A rack 32a that meshes with the pinion 31a is formed on the steering operation shaft member 32. The steered wheels 33 are coupled to both axial ends of the steering operation shaft member 32 via a pair of tie rods 35 and a pair of knuckle arms 36. The steering operation mechanism 30 changes a steered angle δ of each of the steered wheels 33 by moving the steering operation shaft member 32 in its axial direction (vehicle width direction).

The steering operation drive apparatus 34 includes a steering operation motor 37 (see FIG. 3), a speed reducer (not illustrated), a ball screw apparatus (not illustrated), and the like. The steering operation drive apparatus 34 moves the steering operation shaft member 32 in its axial direction by converting output rotation of the steering operation motor 37 to a force in the axial direction of the steering operation shaft member 32 (axial force) and applying the force to the steering operation shaft member 32.

In a state in which the rotational force is transmissible between the first shaft member 21 and the second shaft member 22, the steering system 100 can directly change the steered angle δ of each of the steered wheels 33 through a steering operation for the steering member SW. When the steering member SW is operated, a steering torque applied to the steering member SW is transmitted to the pinion shaft 31 via the steering shaft member 11 and the intermediate shaft 20. When the pinion shaft 31 is rotated by the transmitted steering torque, the rotational force of the pinion shaft 31 is converted to the force in the axial direction of the steering operation shaft member 32. Thus, the steering operation shaft member 32 moves in the axial direction to change the steered angle of each of the steered wheels 33.

When the driving mode is set to the automatic driving mode, the control unit 40 controls the traveling of the vehicle 1. When the driving mode is set to the manual driving mode, the control unit 40 controls the driving of the steering operation motor 37 and the reaction motor 14 in a state in which the transmission of the rotational force is interrupted between the first shaft member 21 and the second shaft member 22.

Specifically, the control unit 40 sets a target steered angle δ* based on detection signals output from a steering angle sensor 51 and a vehicle speed sensor 52. The steering angle sensor 51 detects a steering angle θh of the steering member SW. The vehicle speed sensor 52 detects a vehicle speed V. The control unit 40 controls the driving of the steering operation motor 37 based on the set target steered angle δ* and a detection signal output from a steered angle sensor 53 configured to detect the steered angle δ of each of the steered wheels 33. The control unit 40 controls the driving of the reaction motor 14 based on, for example, detection signals output from the steering angle sensor 51 and a torque sensor 54 configured to detect a steering torque Ta applied to the torsion bar 11c of the steering shaft member 11.

Figure 3:
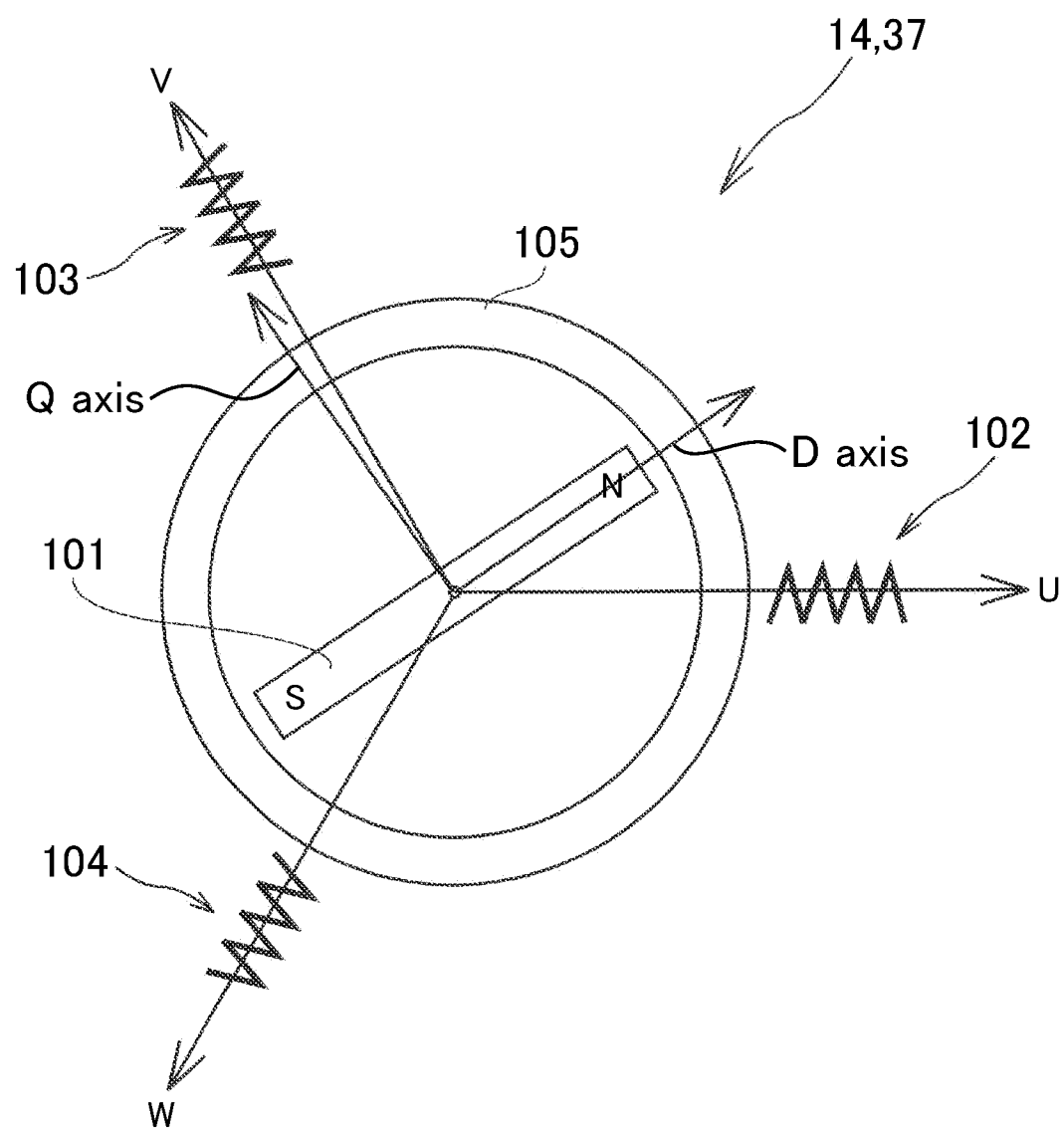
FIG. 3 is a diagram illustrating the structure of each of a steering operation motor and a reaction motor.

The reaction motor 14 and the steering operation motor 37 are described with reference to FIG. 3. As illustrated in FIG. 3, each of the reaction motor 14 and the steering operation motor 37 is a three-phase brushless motor, and includes a rotor 101 serving as a field magnet, and a stator 105 including U-phase, V-phase, and W-phase stator windings 102, 103, and 104. The three-phase brushless motor used as each of the reaction motor 14 and the steering operation motor 37 may be an inner rotor type motor in which the stator 105 is arranged on an outer side of the rotor 101 so as to face the rotor 101, or may be an outer rotor type motor in which the stator 105 is arranged on an inner side of the rotor 101 having a tubular shape so as to face the rotor 101.

A three-phase stationary coordinate system (UVW coordinate system) including a U-axis, a V-axis, and a W-axis is defined in directions of the three-phase stator windings 102, 103, and 104. Further, a two-phase rotating coordinate system (dq coordinate system or actual rotating coordinate system) is defined. The two-phase rotating coordinate system includes a d-axis (magnetic pole axis) in a direction of magnetic poles of the rotor 101, and a q-axis (torque axis) in a direction perpendicular to the d-axis within a rotational plane of the rotor 101. The dq coordinate system is a rotating coordinate system that rotates together with the rotor 101. In the dq coordinate system, only a q-axis current contributes to torque generation in the rotor 101. Therefore, it is appropriate that the q-axis current be controlled based on a desired torque while a d-axis current is set to 0. A rotation angle of the rotor 101 (electrical angle; hereinafter referred to as "rotor angle θs") is a rotation angle of the d-axis with respect to the U-axis. The dq coordinate system is an actual rotating coordinate system based on the rotor angle θs. The use of the rotor angle θs allows coordinate conversion between the UVW coordinate system and the dq coordinate system.

Figure 4:
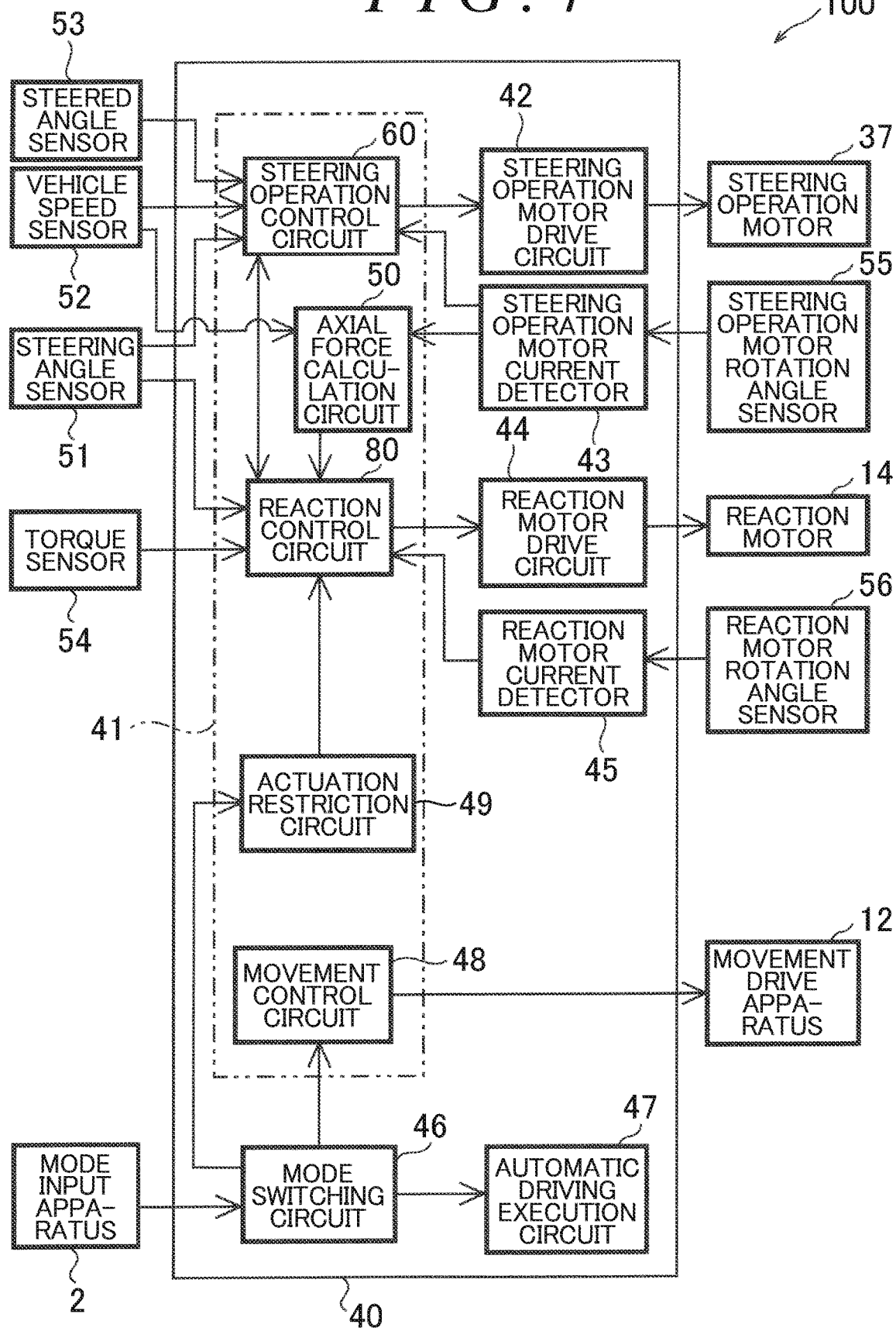
FIG. 4 is a block configuration diagram of a control unit.

Next, the electrical configuration of the control unit 40 is described with reference to FIG. 4. As illustrated in FIG. 4, the control unit 40 mainly includes a microcomputer 41, a steering operation motor drive circuit 42, a steering operation motor current detector 43, a reaction motor drive circuit 44, a reaction motor current detector 45, a mode switching circuit 46, and an automatic driving execution circuit 47.

The microcomputer 41 is constituted by a central processing unit (CPU) and memories (such as a read-only memory (ROM), a random-access memory (RAM), and a non-volatile memory). The microcomputer 41 mainly includes a movement control circuit 48, an actuation restriction circuit 49, an axial force calculation circuit 50, a steering operation control circuit 60, and a reaction control circuit 80. When the driving mode is switched, the movement control circuit 48 controls the driving of the movement drive apparatus 12 to move the steering member SW to the operation position or the retraction position. When the driving mode is the automatic driving mode, the actuation restriction circuit 49 restricts actuation of the steering member SW. The axial force calculation circuit 50 calculates the axial force to be applied from the steering operation drive apparatus 34 to the steering operation shaft member 32 based on steering operation information of the steered wheels 33 including a current value of the steering operation motor 37 and the steered angle δ and based on vehicle condition amounts such as a yaw rate and a lateral acceleration.

The steering operation control circuit 60 controls the driving of the steering operation motor 37 to set the steered angle δ of each of the steered wheels 33. Specifically, the steering operation control circuit 60 controls the steering operation motor drive circuit 42 based on the steering angle θh supplied from the reaction control circuit 80, the vehicle speed V detected by the vehicle speed sensor 52, the steered angle δ detected by the steered angle sensor 53, a signal output from a steering operation motor rotation angle sensor 55 configured to detect a rotation angle of the steering operation motor 37, and a current value detected by the steering operation motor current detector 43.

The reaction control circuit 80 controls the driving of the reaction motor 14 to set the reaction torque to be applied to the steering shaft member 11. Specifically, the reaction control circuit 80 controls the reaction motor drive circuit 44 based on a steering operation-side target steering angle θht* supplied from the steering operation control circuit 60, a signal output from a reaction motor rotation angle sensor 56 configured to detect a rotation angle of the reaction motor 14, and a current value detected by the reaction motor current detector 45.

The steering operation motor drive circuit 42 is an inverter circuit configured to supply electric power to the steering operation motor 37, and is controlled by the microcomputer 41. The steering operation motor current detector 43 detects a motor current flowing through the steering operation motor 37. The reaction motor drive circuit 44 is an inverter circuit configured to supply electric power to the reaction motor 14, and is controlled by the microcomputer 41. The reaction motor current detector 45 detects a motor current flowing through the reaction motor 14.

The mode switching circuit 46 switches the driving mode to the manual driving mode or the automatic driving mode based on the input to the mode input apparatus 2. The automatic driving execution circuit 47 executes traveling control for the vehicle 1 in the automatic driving mode. Based on a command from the mode switching circuit 46, the automatic driving execution circuit 47 starts the traveling control for the vehicle 1 when the driving mode is switched to the automatic driving mode, and terminates the traveling control for the vehicle 1 when the driving mode is switched to the manual driving mode.

Figure 5:
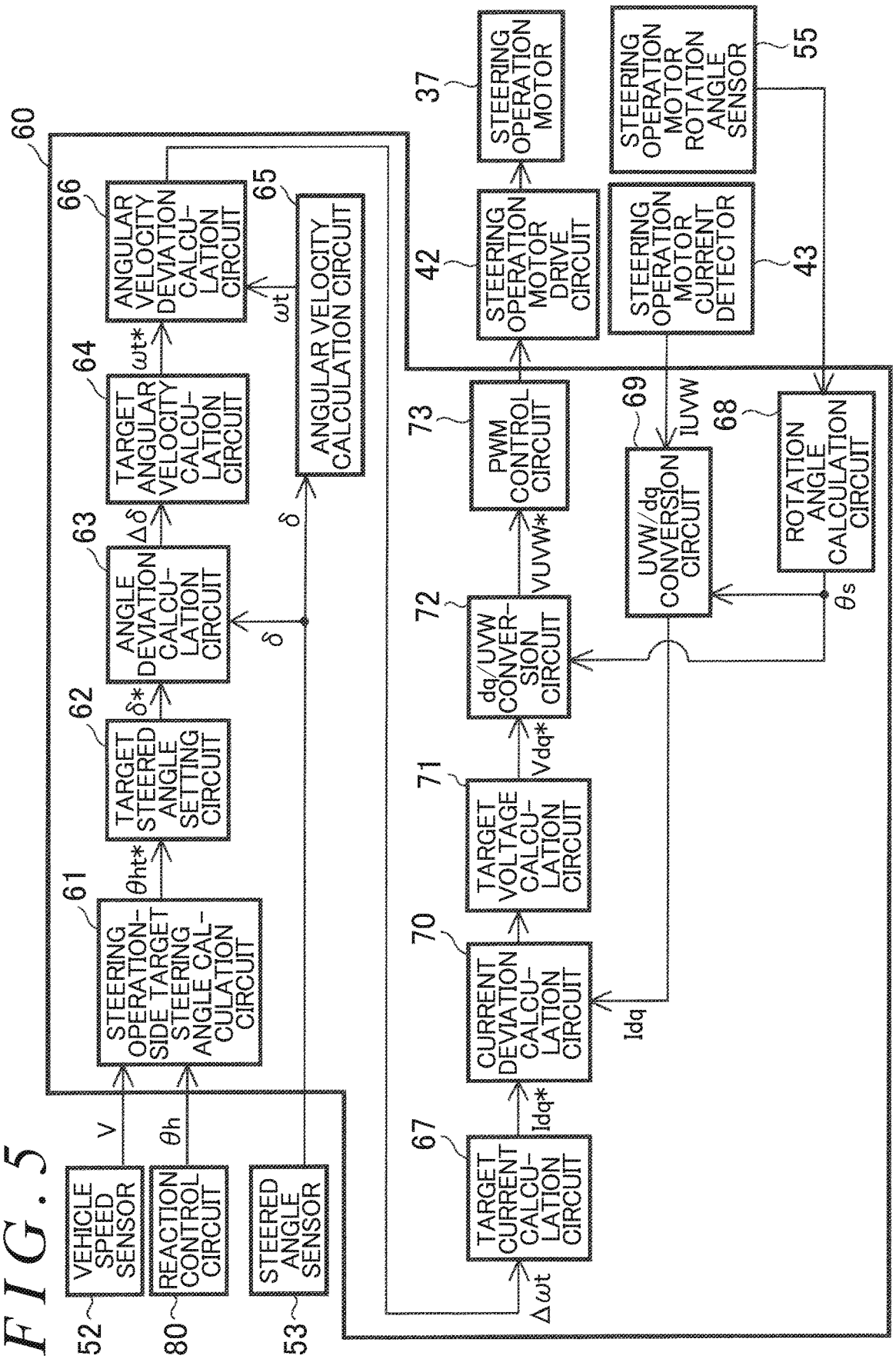
FIG. 5 is a block configuration diagram of a steering operation control circuit.

Next, the configuration of the steering operation control circuit 60 is described with reference to FIG. 5. As illustrated in FIG. 5, the steering operation control circuit 60 includes a steering operation-side target steering angle calculation circuit 61, a target steered angle setting circuit 62, an angle deviation calculation circuit 63, a target angular velocity calculation circuit 64, an angular velocity calculation circuit 65, an angular velocity deviation calculation circuit 66, a target current calculation circuit 67, a rotation angle calculation circuit 68, a UVW/dq conversion circuit 69, a current deviation calculation circuit 70, a target voltage calculation circuit 71, a dq/UVW conversion circuit 72, and a pulse width modulation (PWM) control circuit 73.

The steering operation-side target steering angle calculation circuit 61 calculates the steering operation-side target steering angle $\theta ht^*$ based on the steering angle $\theta h$ (rotation angle of the steering member SW) calculated by the reaction control circuit 80 and the vehicle speed V detected by the vehicle speed sensor 52. The steering operation-side target steering angle $\theta ht^*$ is a target value of the rotation angle of the steering member SW (steering angle). For example, the steering operation-side target steering angle calculation circuit 61 calculates the steering operation-side target steering angle $\theta ht^*$ based on the vehicle speed V and the steering angle $\theta h$ by using a predetermined transfer function.

The target steered angle setting circuit 62 sets the target steered angle $\delta^*$ based on the steering operation-side target steering angle $\theta ht^*$. The target steered angle $\delta^*$ is a target value of the steered angle. The angle deviation calculation circuit 63 calculates an angle deviation $\Delta\delta$ ($=\delta^*-\delta$) between the target steered angle $\delta^*$ set by the target steered angle setting circuit 62 and the steered angle $\delta$ detected by the steered angle sensor 53. Thus, the steering operation control circuit 60 causes the target steered angle setting circuit 62 and the angle deviation calculation circuit 63 to perform angle feedback control during the driving control for the steering operation motor 37 (hereinafter referred to as "steering operation control").

The target angular velocity calculation circuit 64 calculates a target steered angle velocity $\omega t^*$ through calculation (for example, proportional-integral (PI) calculation) for the angle deviation $\Delta\delta$ calculated by the angle deviation calculation circuit 63. The target steered angle velocity $\omega t^*$ is a target value of a steered angle velocity. The angular velocity calculation circuit 65 calculates a steered angle velocity $\omega t$ of the steered angle $\delta$ detected by the steered angle sensor 53 by determining a time derivative of the steered angle $\delta$. The angular velocity deviation calculation circuit 66 calculates an angular velocity deviation $\Delta\omega t$ ($=\omega t^*-\omega t$) between the target steered angle velocity $\omega t^*$ calculated by the target angular velocity calculation circuit 64 and the steered angle velocity $\omega t$ calculated by the angular velocity calculation circuit 65. Thus, the steering operation control circuit 60 causes the target angular velocity calculation circuit 64 and the angular velocity deviation calculation circuit 66 to perform angular velocity feedback control during the steering operation control.

The target current calculation circuit 67 calculates target currents through calculation (for example, PI calculation) for the angular velocity deviation $\Delta\omega t$ calculated by the angular velocity deviation calculation circuit 66. The target current is a target value of a current to be caused to flow in each coordinate axis of the dq coordinate system. Specifically, the target current calculation circuit 67 calculates a target d-axis current Id* and a target q-axis current Iq* (hereinafter may be referred to collectively as "target two-phase current Idq*"). The target current calculation circuit 67 calculates the target q-axis current Iq* as a significant value, and calculates the target d-axis current Id* as 0.

The rotation angle calculation circuit 68 calculates the rotation angle of the rotor 101 (electrical angle; rotor angle $\theta s$) of the steering operation motor 37 based on the signal output from the steering operation motor rotation angle sensor 55. The UVW/dq conversion circuit 69 converts a U-phase current IU, a V-phase current IV, and a W-phase current IW (hereinafter may be referred to collectively as "three-phase detection current IUVW") detected by the steering operation motor current detector 43 to two-phase detection currents Id and Iq (hereinafter may be referred to collectively as "two-phase detection current Idq") in the dq coordinate system. The UVW/dq conversion circuit 69 performs the coordinate conversion by using the rotor angle $\theta s$ calculated by the rotation angle calculation circuit 68.

The current deviation calculation circuit 70 calculates a deviation between the target two-phase current Idq* calculated by the target current calculation circuit 67 and the two-phase detection current Idq supplied from the UVW/dq conversion circuit 69. The current deviation calculation circuit 70 calculates a deviation of the d-axis detection current Id from the target d-axis current Id* and a deviation of the q-axis detection current Iq from the target q-axis current Iq*. The target voltage calculation circuit 71 generates a target two-phase voltage Vdq* (target d-axis voltage Vd* and target q-axis voltage Vq*) to be applied to the steering operation motor 37 through calculation for the current deviation calculated by the current deviation calculation circuit 70. Thus, the steering operation control circuit 60 causes the target current calculation circuit 67 and the current deviation calculation circuit 70 to perform current feedback control during the steering operation control.

The dq/UVW conversion circuit 72 converts the target two-phase voltage Vdq* to a target three-phase voltage VUVW*. The coordinate conversion is performed by using the rotor angle $\theta s$ calculated by the rotation angle calculation circuit 68. The target three-phase voltage VUVW* includes a target U-phase voltage VU*, a target V-phase voltage VV*, and a target W-phase voltage VW*. The PWM control circuit 73 generates a U-phase PWM control signal, a V-phase PWM control signal, and a W-phase PWM control signal having duties corresponding to the target U-phase voltage VU*, the target V-phase voltage VV*, and the target W-phase voltage VW*, respectively, and supplies the U-phase PWM control signal, the V-phase PWM control signal, and the NV-phase PWM control signal to the steering operation motor drive circuit 42.

The steering operation motor drive circuit 42 is a three-phase inverter circuit corresponding to the U phase, the V phase, and the W phase. When power elements that constitute the inverter circuit are controlled by the PWM control signals, voltages corresponding to the target three-phase voltage VUVW* are applied to the stator windings 102, 103, and 104 of the respective phases of the steering operation motor 37. The steering operation motor current detector 43 detects the three-phase detection current IUVW (U-phase current IU, V-phase current IV, and W-phase current IW) of the steering operation motor 37 in the UVW coordinate system.

Figure 6:
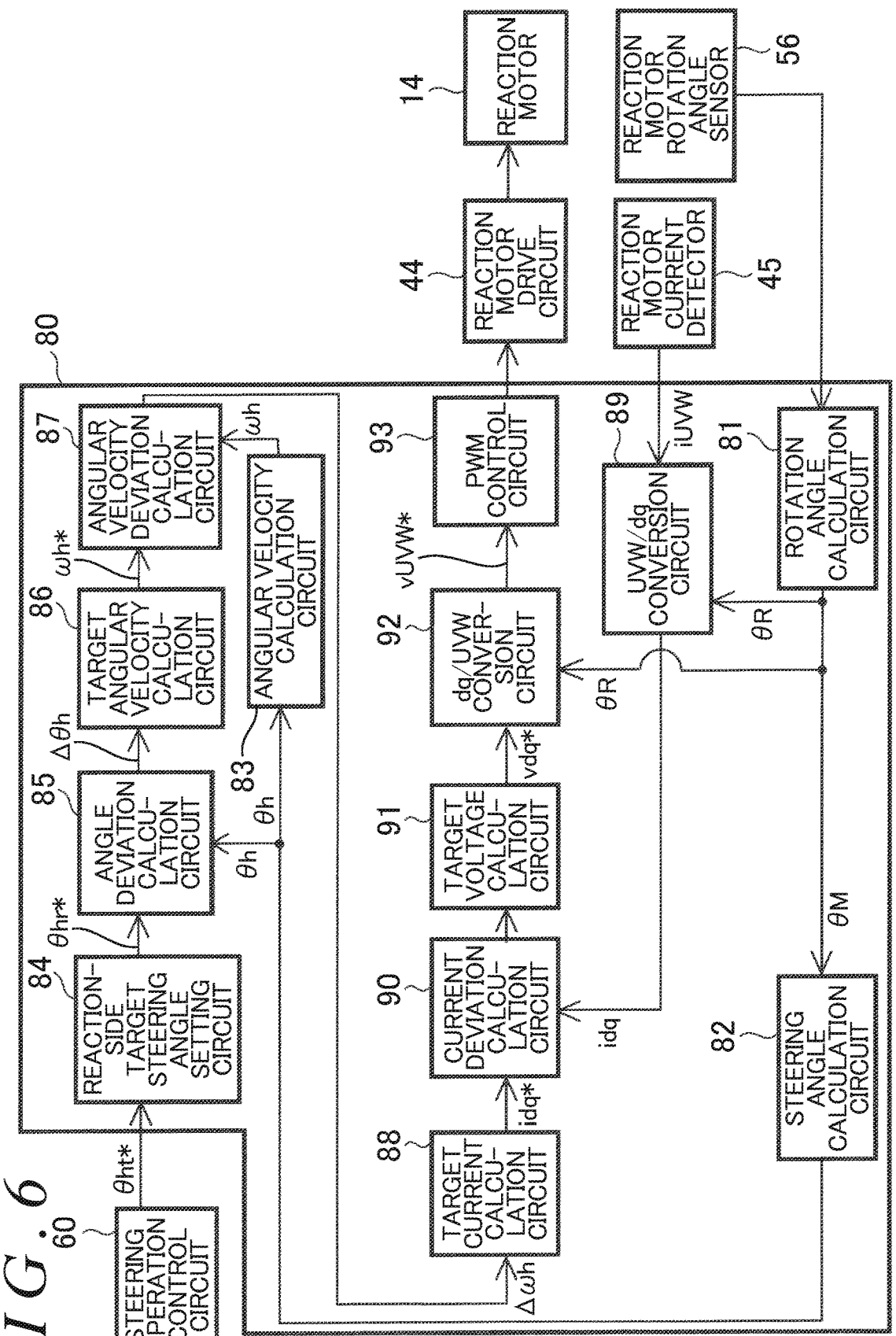
FIG. 6 is a block configuration diagram of a reaction control circuit.

Next, an example of the reaction control circuit 80 is described with reference to FIG. 6. As illustrated in FIG. 6, the reaction control circuit 80 includes a rotation angle calculation circuit 81, a steering angle calculation circuit 82, an angular velocity calculation circuit 83, a reaction-side target steering angle setting circuit 84, an angle deviation calculation circuit 85, a target angular velocity calculation circuit 86, an angular velocity deviation calculation circuit 87, a target current calculation circuit 88, a UVW/dq conversion circuit 89, a current deviation calculation circuit 90, a target voltage calculation circuit 91, a dq/UVW conversion circuit 92, and a PWM control circuit 93.

The rotation angle calculation circuit 81 calculates an electrical angle θR and a mechanical angle θM of the rotor 101 of the reaction motor 14 based on the signal output from the reaction motor rotation angle sensor 56. The steering angle calculation circuit 82 calculates the steering angle θh by dividing the mechanical angle θM of the rotor 101 of the reaction motor 14 by a speed reducing ratio of the speed reducer 15. In this embodiment, the steering angle calculation circuit 82 calculates rotation amounts (rotation angles) of the steering shaft member 11 in both forward and backward directions from a neutral position (reference position) of the steering shaft member 11. For example, the steering angle calculation circuit 82 outputs a rightward rotation amount from the neutral position as a positive value, and outputs a leftward rotation amount from the neutral position as a negative value. The angular velocity calculation circuit 83 calculates an angular velocity (steering angle velocity) ωh of the steering angle θh calculated by the steering angle calculation circuit 82 by determining a time derivative of the steering angle θh.

The reaction-side target steering angle setting circuit 84 sets a reaction-side target steering angle θhr* based on the steering operation-side target steering angle θht* calculated by the steering operation-side target steering angle calculation circuit 61 of the steering operation control circuit 60. The reaction-side target steering angle θhr* is a target value of the rotation angle of the steering member SW. In this embodiment, the reaction-side target steering angle setting circuit 84 sets the steering operation-side target steering angle θht* calculated by the steering operation-side target steering angle calculation circuit 61 as the reaction-side target steering angle θhr*. The angle deviation calculation circuit 85 calculates an angle deviation Δθh (=θhr*−θh) between the reaction-side target steering angle θhr* set by the reaction-side target steering angle setting circuit 84 and the steering angle θh calculated by the steering angle calculation circuit 82. Thus, the reaction control circuit 80 causes the reaction-side target steering angle setting circuit 84 and the angle deviation calculation circuit 85 to perform angle feedback control during the driving control for the reaction motor 14 (hereinafter referred to as "reaction control").

The target angular velocity calculation circuit 86 calculates a target steering angle velocity ωh* through calculation (for example, PI calculation) for the angle deviation Δθh calculated by the angle deviation calculation circuit 85. The target steering angle velocity ωh* is a target value of the steering angle velocity. The angular velocity deviation calculation circuit 87 calculates an angular velocity deviation Δωh (=ωh*−ωh) between the target steering angle velocity ωh* calculated by the target angular velocity calculation circuit 86 and the steering angle velocity ωh calculated by the angular velocity calculation circuit 83. Thus, the reaction control circuit 80 causes the target angular velocity calculation circuit 86 and the angular velocity deviation calculation circuit 87 to perform angular velocity feedback control during the reaction control.

The target current calculation circuit 88 calculates target currents through calculation (for example, PI calculation) for the angular velocity deviation Δωh calculated by the angular velocity deviation calculation circuit 87. The target current is a target value of a current to be caused to flow in each coordinate axis of the dq coordinate system. Specifically, the target current calculation circuit 88 calculates a target d-axis current id* and a target q-axis current iq* (hereinafter may be referred to collectively as "target two-phase current idq*"). The target current calculation circuit 88 calculates the target q-axis current iq* as a significant value, and calculates the target d-axis current id* as 0.

The UVW/dq conversion circuit 89 converts a three-phase detection current iUVW (U-phase current iU, V-phase current iV, and W-phase current iW) in the UVW coordinate system, which is detected by the reaction motor current detector 45, to two-phase detection currents id and iq (hereinafter may be referred to collectively as "two-phase detection current idq") in the dq coordinate system. The coordinate conversion is performed by using the electrical angle θR calculated by the rotation angle calculation circuit 81.

The current deviation calculation circuit 90 calculates a deviation between the target two-phase current idq* calculated by the target current calculation circuit 88 and the two-phase detection current idq supplied from the UVW/dq conversion circuit 89. Specifically, the current deviation calculation circuit 90 calculates a deviation of the d-axis detection current id from the target d-axis current id* and a deviation of the q-axis detection current iq from the target q-axis current iq*. The target voltage calculation circuit 91 generates a target two-phase voltage vdq* (target d-axis voltage vd* and target q-axis voltage vq*) to be applied to the reaction motor 14 through calculation (for example, PI calculation) for the current deviation calculated by the current deviation calculation circuit 90. Thus, the reaction control circuit 80 causes the target current calculation circuit 88 and the current deviation calculation circuit 90 to perform current feedback control during the reaction control.

The dq/UVW conversion circuit 92 converts the target two-phase voltage vdq* to a target three-phase voltage vUVW*. The coordinate conversion is performed by using the electrical angle θR calculated by the rotation angle calculation circuit 81. The target three-phase voltage vUVW* includes a target U-phase voltage vU*, a target V-phase voltage vV*, and a target W-phase voltage vW*. The PWM control circuit 93 generates a U-phase PWM control signal, a V-phase PWM control signal, and a W-phase PWM control signal having duties corresponding to the target U-phase voltage vU*, the target V-phase voltage vV*, and the target W-phase voltage vW*, respectively, and supplies the U-phase PWM control signal, the V-phase PWM control signal, and the W-phase PWM control signal to the reaction motor drive circuit 44.

The reaction motor drive circuit 44 is a three-phase inverter circuit corresponding to the U phase, the V phase, and the W phase. When power elements that constitute the inverter circuit are controlled by the PWM control signals supplied from the PWM control circuit 93, voltages corresponding to the target three-phase voltage vUVW* are applied to the stator windings 102, 103, and 104 of the respective phases of the reaction motor 14.

Figure 7:
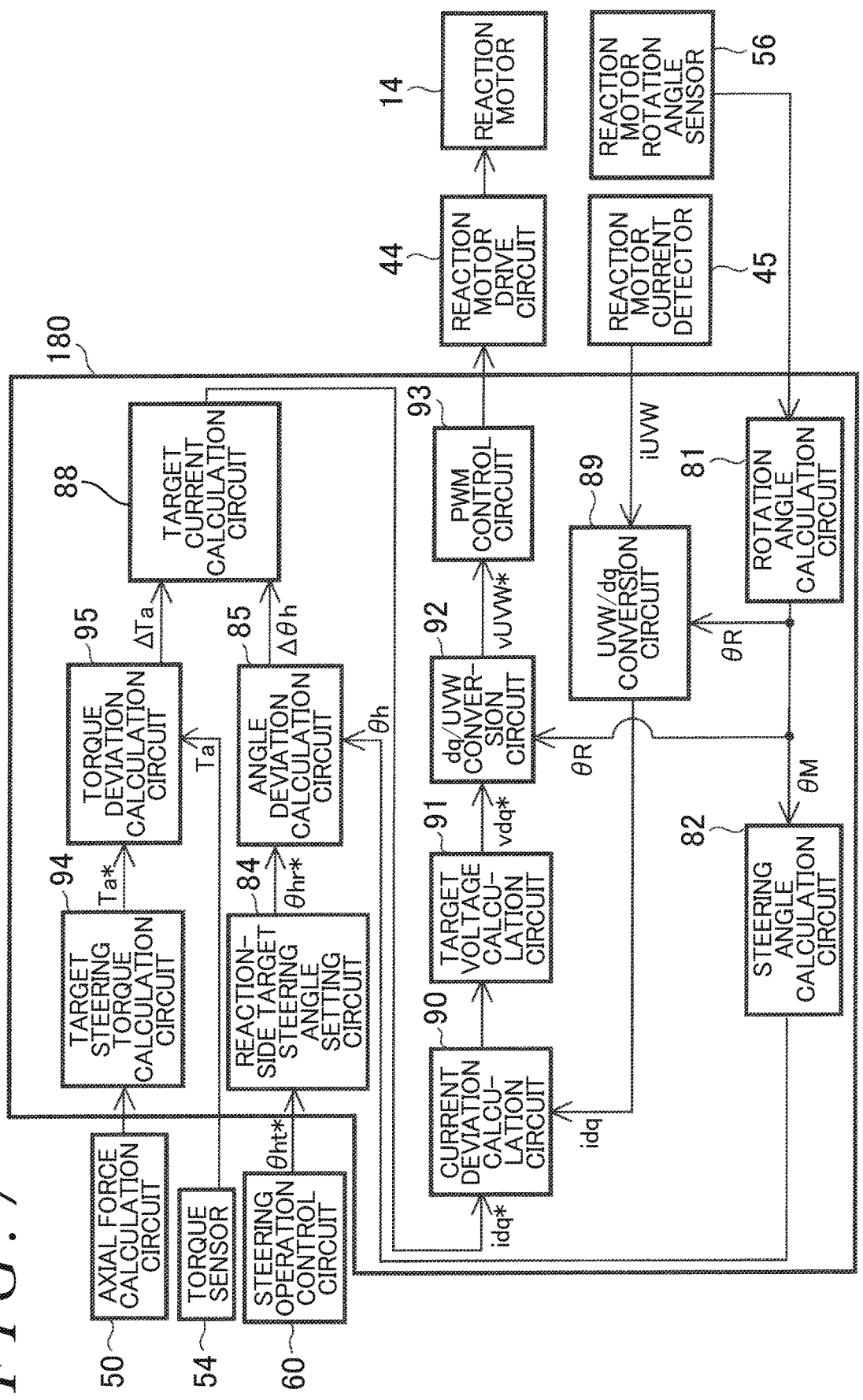
FIG. 7 is a block configuration diagram of a reaction control circuit according to a modified example.

Next, a reaction control circuit 180 that is a modified example of the reaction control circuit 80 is described with reference to FIG. 7. In the reaction control circuit 180 illustrated in FIG. 7, the target angular velocity calculation circuit 86 and the angular velocity deviation calculation circuit 87 are omitted, and a target steering torque calculation circuit 94 and a torque deviation calculation circuit 95 are additionally provided in comparison to the reaction control circuit 80 illustrated in FIG. 6. Description is omitted for the same parts as those of the reaction control circuit 80 illustrated in FIG. 6.

The target steering torque calculation circuit 94 sets a target steering torque Ta* based on the axial force calculated by the axial force calculation circuit 50. The target steering torque Ta* is a target value of the steering torque. When the driving mode is the manual driving mode, the torque deviation calculation circuit 95 calculates a torque deviation ΔTa (=Ta*−Ta) between the target steering torque Ta* set by the target steering torque calculation circuit 94 and the steering torque Ta detected by the torque sensor 54. That is, the reaction control circuit 180 according to the modified example causes the target steering torque calculation circuit 94 and the torque deviation calculation circuit 95 to perform torque feedback control.

Thus, when the driving mode is the manual driving mode, the reaction control circuit 180 performs the reaction control based on steering information of the steering member SW. When the driving mode is the automatic driving mode, the steering torque is not generated in the vehicle 1 because the steering operation for the steering member SW is not performed by the occupant P.

Therefore, the control unit 40 derives an imaginary steering torque Ta based on a value that is calculated by the axial force calculation circuit 50 based on the steering operation information of the steered wheels 33, and the torque deviation calculation circuit 95 calculates a torque deviation ΔTa between the derived imaginary steering torque Ta and the target steering torque Ta*. Even when the driving mode is the automatic driving mode, the reaction control circuit 180 can control the reaction motor drive circuit 44 by a method similar to that in the manual driving mode. Thus, the control of the reaction control circuit 180 can be simplified.

The target current calculation circuit 88 calculates target currents based on the torque deviation ΔTa calculated by the torque deviation calculation circuit 95 and the angle deviation Δθh calculated by the angle deviation calculation circuit 85. The target current is a target value of a current to be caused to flow in each coordinate axis of the dq coordinate system.

As described above, the control unit 40 controls the reaction motor drive circuit 44 based on the imaginary steering torque Ta obtained through calculation in the automatic driving mode in which the steering operation for the steering member SW is not performed. Thus, the control unit 40 can cause the reaction control circuit 80 or 180 to perform the reaction control even in a state in which the steering member SW is retracted to the retraction position. When the driving mode is the automatic driving mode and when the reaction control circuit 80 or 180 performs reaction control similar to that in the manual driving mode, the reaction torque is applied from the reaction drive apparatus 13 to the steering shaft member 11. As a result, the steering member SW is actuated by being driven by the reaction drive apparatus 13 though the occupant P is not performing the steering operation for the steering member SW.

When the driving mode is switched from the manual driving mode to the automatic driving mode, the actuation restriction circuit 49 restricts the actuation of the steering member SW. Description is given below of a specific example of the restriction of the actuation of the steering member SW, which is performed by the actuation restriction circuit 49.

Steering member moving processing to be executed by the control unit 40 is described with reference to a flowchart illustrated in FIG. 8. The steering member moving processing is performed when the driving mode is switched. The steering member SW is moved to the operation position or the retraction position based on the driving mode.

Figure 8:
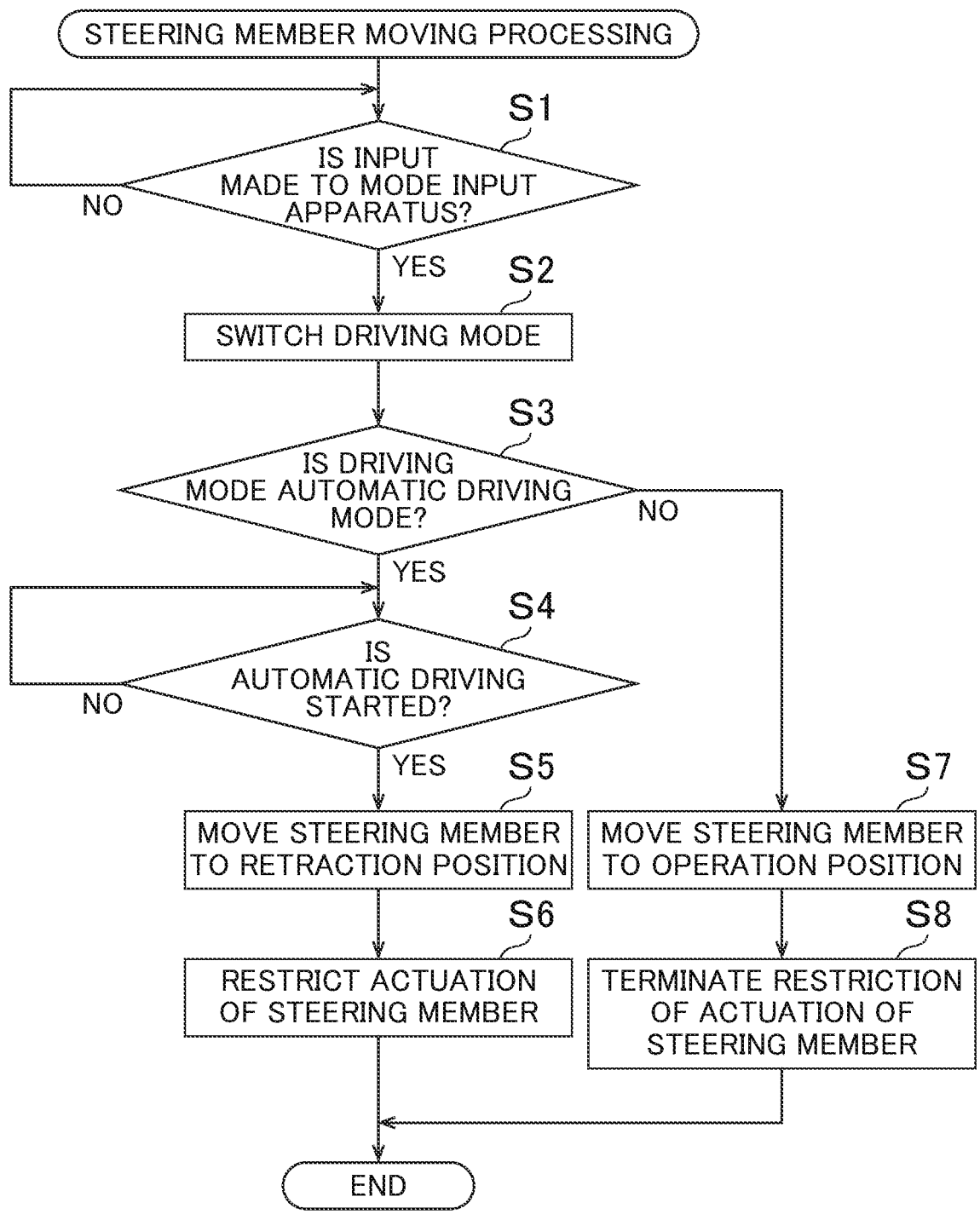
FIG. 8 is a flowchart illustrating steering member moving processing to be executed by the control unit.

As illustrated in FIG. 8, the control unit 40 determines whether an input is made to the mode input apparatus 2 (S1). When no input is made to the mode input apparatus 2 (S1: No), the control unit 40 repeats the processing of S1. When the input is made to the mode input apparatus 2 (S1: Yes), the driving mode is switched by the mode switching circuit 46 (S2).

After the processing of S2, the control unit 40 determines whether the switched driving mode is the automatic driving mode (S3). When the driving mode is the automatic driving mode (S3: Yes), the control unit 40 determines whether the automatic driving is started (S4). When the automatic driving is not started (S4: No), the control unit 40 repeats the processing of S4. When the automatic driving is started (S4: Yes), the movement control circuit 48 drives the movement drive apparatus 12 to move the steering member SW from the operation position to the retraction position (S5).

In order to secure safety, the vehicle 1 needs to keep a state in which the steering operation for the steering member SW is executable by the occupant P until the automatic driving execution circuit 47 starts the traveling control for the vehicle 1 after the input is made to the mode input apparatus 2. Therefore, the control unit 40 starts to move the steering member SW after the automatic driving execution circuit 47 starts the traveling control for the vehicle 1 based on a command from the mode switching circuit 46.

After the processing of S5, the control unit 40 causes the actuation restriction circuit 49 to restrict the actuation of the steering member SW (S6), and terminates this steering member moving processing. Thus, when the driving mode is switched to the automatic driving mode, the control unit 40 moves the steering member SW to the retraction position, and restricts the actuation of the steering member SW.

In this embodiment, description is given of the case where the actuation restriction circuit 49 restricts the actuation of the steering member SW (S6) after the movement control circuit 48 starts to move the steering member SW (S5). The actuation restriction circuit 49 may restrict the actuation of the steering member SW (S6) before the movement control circuit 48 starts to move the steering member SW (S5). In this case, the vehicle 1 can prevent the steering member SW from being actuated during its movement. When the actuation of the steering member SW is restricted after the movement of the steering member SW is started, the actuation of the steering member SW may be restricted during the movement of the steering member SW or after completion of the movement of the steering member SW. In this case, the vehicle 1 can start to move the steering member SW early.

When the switched driving mode is not the automatic driving mode, that is, the switched driving mode is the manual driving mode in the processing of S3 (S3: No), the movement control circuit 48 drives the movement drive apparatus 12 to move the steering member SW from the retraction position to the operation position (S7). Then, the actuation restriction circuit 49 terminates the restriction of the actuation of the steering member SW (S8), and the control unit 40 terminates this steering member moving processing. Also in this case, the control unit 40 may cause the actuation restriction circuit 49 to terminate the restriction of the actuation of the steering member SW (S8) before the movement control circuit 48 starts to move the steering member SW (S7). After the processing of S8 is finished, the control unit 40 terminates the traveling control of the automatic driving execution circuit 47.

Referring to FIG. 9, description is given of specific examples of the restriction of the actuation of the steering member SW, which is performed by the actuation restriction circuit 49.

For example, as in Pattern 1 illustrated in FIG. 9, the actuation restriction circuit 49 stops the reaction control of the reaction control circuit 80 or 180 in the automatic driving mode. Specifically, based on a command from the actuation restriction circuit 49, the reaction control circuit 80 or 180 stops the current supply to the reaction motor 14 to achieve a state in which no reaction torque is applied to the steering shaft member 11.

In Pattern 1, the actuation restriction circuit 49 also sends a command to or drives and controls a restriction apparatus (not illustrated) provided in the steering system 100 to mechanically restrict the actuation of the steering member SW, thereby suppressing rocking motion of the steering member SW. Examples of the restriction apparatus include an apparatus configured to hold the steering member SW arranged at the retraction position, an apparatus configured to restrict the rocking motion of the steering member SW by inserting a plurality of bar-shaped members into the steering member SW, and a publicly-known steering member locking apparatus provided on the steering shaft member 11.

Instead of stopping the reaction control, the reaction control circuit 80 or 180 may perform reaction control in the automatic driving mode so as to prevent the actuation of the steering member SW based on a command from the actuation restriction circuit 49.

For example, as in Pattern 2 illustrated in FIG. 9, the reaction control circuit 80 or 180 may perform reaction control in the automatic driving mode so that the reaction torque applied to the steering shaft member 11 (current supplied to the reaction motor 14) is equal to or smaller than a predetermined value (equal to or smaller than a value that is smaller than that of a reaction torque during execution of normal reaction control; including 0). Thus, the reaction control circuit 80 or 180 can achieve a state in which substantially no reaction torque is applied to the steering shaft member 11 in the automatic driving mode.

As in Pattern 3 illustrated in FIG. 9, the reaction control circuit 80 or 180 may fix the reaction-side target steering angle θhr* to be set by the reaction-side target steering angle setting circuit 84 to 0 in the automatic driving mode. Thus, the actuation of the steering member SW can be restricted in a state in which the steering angle θh of the steering member SW is set neutral by the reaction control circuit 80 or 180. For example, when the steering member SW has a non-circular shape in the vehicle 1, the space provided as the retraction position can be reduced by moving the steering member SW to the retraction position in the state in which the steering angle θh is neutral. Further, the steering system 100 can suppress the rocking motion of the steering member SW without mechanically restricting the actuation of the steering member SW by the restriction apparatus.

As in Pattern 4 illustrated in FIG. 9, when the driving mode is switched to the automatic driving mode, the reaction control circuit 80 or 180 may fix the reaction-side target steering angle θhr* to be set by the reaction-side target steering angle setting circuit 84 to the reaction-side target steering angle θhr* at the time when the driving mode is switched. In this case, the actuation of the steering member SW can be restricted in a state in which the steering angle θh of the steering member SW is kept as the angle at the time when the driving mode is switched. Further, the steering system 100 can suppress the rocking motion of the steering member SW without mechanically restricting the actuation of the steering member SW by the restriction apparatus.

As in Pattern 5 illustrated in FIG. 9, the actuation of the steering member SW may be restricted in the automatic driving mode such that the reaction control circuit 80 or 180 performs lock energization for fixing the rotation angle of the rotor 101 at a predetermined angle by setting the U-phase current iU, the V-phase current iV, and the W-phase current iW to constant values. As in Pattern 6 illustrated in FIG. 9, the actuation of the steering member SW may be restricted in the automatic driving mode such that the reaction control circuit 80 or 180 performs phase-fixed energization for fixing the phase of energization to any one phase out of the U phase, the V phase, and the W phase. In those cases, the steering system 100 can suppress the rocking motion of the steering member SW without mechanically restricting the actuation of the steering member SW by the restriction apparatus.

As in Pattern 7 illustrated in FIG. 9, the reaction control circuit 80 or 180 may set a gain for use in the calculation of the current deviation by the current deviation calculation circuit 90 to be equal to or smaller than a predetermined value (equal to or smaller than a value that is smaller than that of a gain for use during execution of normal reaction control; including 0) in the automatic driving mode based on a command from the actuation restriction circuit 49. Similarly, the reaction control circuit 80 or 180 may set a gain for use in the calculation of the angle deviation Δθh by the angle deviation calculation circuit 85, a gain for use in the calculation of the angular velocity deviation Δωh by the angular velocity deviation calculation circuit 87, or a gain for use in the calculation of the torque deviation ΔTa by the torque deviation calculation circuit 95 to be equal to or smaller than a predetermined value in the automatic driving mode based on a command from the actuation restriction circuit 49.

That is, the reaction control circuit 80 or 180 may set the gain to 0 or to be equal to or smaller than the predetermined value in the automatic driving mode in the angle feedback control, the angular velocity feedback control, the current feedback control, or the torque feedback control to be executed during the reaction control. Thus, the reaction control circuit 80 or 180 can achieve a state in which substantially no reaction torque is applied to the steering shaft member 11 in the automatic driving mode.

As in Pattern 8 illustrated in FIG. 9, the reaction control circuit 80 or 180 may set the current deviation to be equal to or smaller than a predetermined value (equal to or smaller than a value that is smaller than that of a deviation during execution of normal reaction control; including 0) in the automatic driving mode based on a command from the actuation restriction circuit 49 irrespective of the calculation result of the current deviation calculation circuit 90. Similarly, the reaction control circuit 80 or 180 may set the angle deviation $\Delta\theta h$, the angular velocity deviation $\Delta\omega h$, or the torque deviation $\Delta Ta$ to be equal to or smaller than a predetermined value in the automatic driving mode based on a command from the actuation restriction circuit 49 irrespective of the calculation result of the angle deviation calculation circuit 85, the angular velocity deviation calculation circuit 87, or the torque deviation calculation circuit 95.

That is, the reaction control circuit 80 or 180 may set the current deviation, the angle deviation $\Delta\theta h$, the angular velocity deviation $\Delta\omega h$, or the torque deviation $\Delta Ta$ to 0 or to be equal to or smaller than the predetermined value in the automatic driving mode in the angle feedback control, the angular velocity feedback control, the current feedback control, or the torque feedback control to be executed during the reaction control. Thus, the reaction control circuit 80 or 180 can achieve a state in which substantially no reaction torque is applied to the steering shaft member 11 in the automatic driving mode.

As described above, the actuation restriction circuit 49 restricts the actuation of the steering member SW in the automatic driving mode. Thus, the steering system 100 can reduce the occurrence of the case where the steering member arranged at the retraction position is actuated by being driven by the reaction drive apparatus. As a result, the steering system 100 can prevent the occupant P from feeling strange due to the actuation of the steering member SW arranged at the retraction position. Further, the steering system 100 can prevent the steering member SW arranged at the retraction position from coming into contact with the occupant P or other devices provided in the cabin due to the actuation of the steering member SW, for example, when the steering member SW has a non-circular shape or when the steering member SW is arranged at the retraction position in a state in which the steering shaft member 11 is bent.

The present invention has been described above based on the embodiment, but is not limited to the embodiment described above. It can easily be understood that various modifications may be made without departing from the spirit of the present invention.

For example, the driving control for the steering operation motor 37 that is performed by the steering operation control circuit 60 and the driving control for the reaction motor 14 that is performed by the reaction control circuit 80 or 180 in the embodiment described above are examples. For example, the angle feedback control, the angular velocity feedback control, the current feedback control, and the torque feedback control may be executed in any combination and in any order during the reaction control of the reaction control circuit.

When the reaction control circuit includes two or more types of feedback control out of the four types of feedback control described above, it is preferable that the reaction control circuit set the gain or the current deviation to 0 or to be equal to or smaller than the predetermined value in the automatic driving mode in feedback control to be performed finally (feedback control closest to the reaction motor 14 in order in the block configuration diagram of FIG. 6 or the like; current feedback control in the embodiment described above). In this case, the reaction control circuit can bring the reaction torque closer to 0.

In the embodiment described above, the intermediate shaft 20 includes the driving force transmission apparatus 23, and the driving force transmission apparatus 23 transmits the rotational force between the first shaft member 21 and the second shaft member 22 or interrupts the transmission of the rotational force. The intermediate shaft 20 need not include the driving force transmission apparatus 23. In this case, the degree of freedom can be increased in terms of design for the movement of the steering member SW to the retraction position.

What is claimed is:

1. A steering system, comprising:
a mode input apparatus configured to input a manual driving mode that is based on an operation to be performed by an occupant, and an automatic driving mode that is not based on the operation to be performed by the occupant;
a steering member configured to be located at an operation position in the manual driving mode, and to be located at a predetermined retraction position different from the operation position in the automatic driving mode;
a reaction drive apparatus comprising a reaction motor as a drive source configured to apply a reaction force to the steering member, the reaction force being exerted in a direction opposite to a direction of a steering operation for the steering member;
a steering operation drive apparatus configured to turn a steered wheel;
a movement drive apparatus configured to move the steering member between the operation position and the retraction position;
a mode switching circuit configured to switch the manual driving mode and the automatic driving mode based on an input to the mode input apparatus;
a movement control circuit configured to control the movement drive apparatus to move the steering member to the operation position when switching to the manual driving mode is performed, and to move the steering member to the retraction position when switching to the automatic driving mode is performed;
an actuation restriction circuit configured to control the reaction drive apparatus so as to substantially restrict actuation of the steering member in the automatic driving mode; and
a reaction control circuit configured to:
control the reaction drive apparatus in the manual driving mode based on steering information of the steering member and steering operation information of the steering operation drive apparatus, and
perform driving control for the reaction motor in the automatic driving mode so as to substantially restrict actuation of the steering member based on a command from the actuation restriction circuit, the driving control for the reaction motor that is performed by the reaction control circuit including angle feedback control that applies the reaction force and is performed based on an angle deviation that is a deviation between a steering angle of the steering member driven by the reaction motor and a target steering angle that is a target value of the steering angle.

2. The steering system according to claim 1, wherein, the actuation restriction circuit is configured such that when the switching to the automatic driving mode is performed, the actuation restriction circuit substantially restricts the actuation of the steering member before the steering member starts movement to the retraction position or after the steering member completes the movement to the retraction position.

\* \* \* \* \*